Nov. 26, 1957 H. E. BESTE 2,814,757

TELEVISION SYSTEM

Filed Dec. 24, 1954 2 Sheets-Sheet 1

INVENTOR.
HAROLD E. BESTE
BY Darby & Darby
ATTORNEYS

Nov. 26, 1957 H. E. BESTE 2,814,757

TELEVISION SYSTEM

Filed Dec. 24, 1954 2 Sheets-Sheet 2

INVENTOR.
HAROLD E. BESTE

BY Darby & Darby

ATTORNEYS

United States Patent Office 2,814,757

Patented Nov. 26, 1957

2,814,757

TELEVISION SYSTEM

Harold E. Beste, Verona, N. J., assignor to Allen B. Du Mont Laboratories, Inc., Clifton, N. J., a corporation of Delaware

Application December 24, 1954, Serial No. 477,497

15 Claims. (Cl. 315—21)

This invention relates to cathode ray tubes for color television, and in particular to a one-gun stripe tube.

While many types of tubes have been suggested, each has an important shortcoming. Prior art dot-type tubes are inefficient because of the shadow mask, and complex electro-optically because of the three separate electron beams. The so-called "Lawrence" tube requires a heavy-duty switching circuit with resultant radiation problems. Other tubes require complicated deflection circuits or additional beams.

It is therefore one object of this invention to provide a simpler, more efficient color tube for television.

It is another object to provide an improved color-television tube which uses phosphor stripes and requires only a single electron gun.

Other objects will become apparent during the following explanation which is offered in conjunction with the drawings of which, Figure 1 is a diagrammatic cut-away view of the instant invention;

Figures 5, 6:
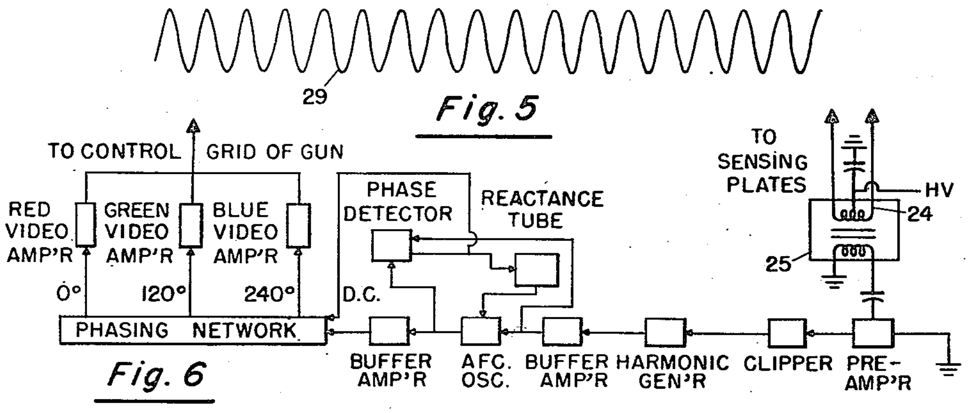
Figure 6 is a block diagram of the electrical circuit.
Figure 6A:
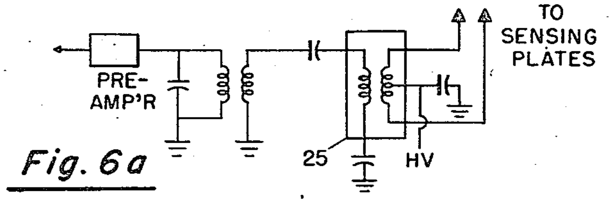

Figure 6*a* shows a modification of the circuit of Figure 6.

In the usual black and white television tube the fluorescent material forms a continuous layer over the entire viewing area. When the tube receives video information, a fluorescing spot is immediately formed.

For a color television tube the above situation is immeasurably more complex. In this case, when red color information is received a red spot must be formed. Similarly, blue video information must produce a blue spot; and the same stipulation must exist for green.

The foregoing paragraph indicates the need for various functions in a television tube. The first is the "writing" function which produces a picture whenever video information is received; this is common to both monochrome and color tubes. The second is a "sensing" function, which is specific to a one-gun color television tube. This requires that the position of the "writing spot" be "sensed" in some way so that only video information of the proper color is utilized. Thus if the writing spot is on a red light emitting area, red color information must be utilized while all other color information must be suppressed.

The instant invention contemplates combining these two functions into a single electron beam, thereby synchronizing the position of the writing spot with the phasing circuits which apply video information to the gun. This means that whatever the position of the spot, only video information of the proper color will be applied to the gun. Thus regardless of whether the transmitted signal be of the line, field, frame, simultaneous, or interlaced type, this invention will assure that each color area will receive only its own color information.

Figure 1:
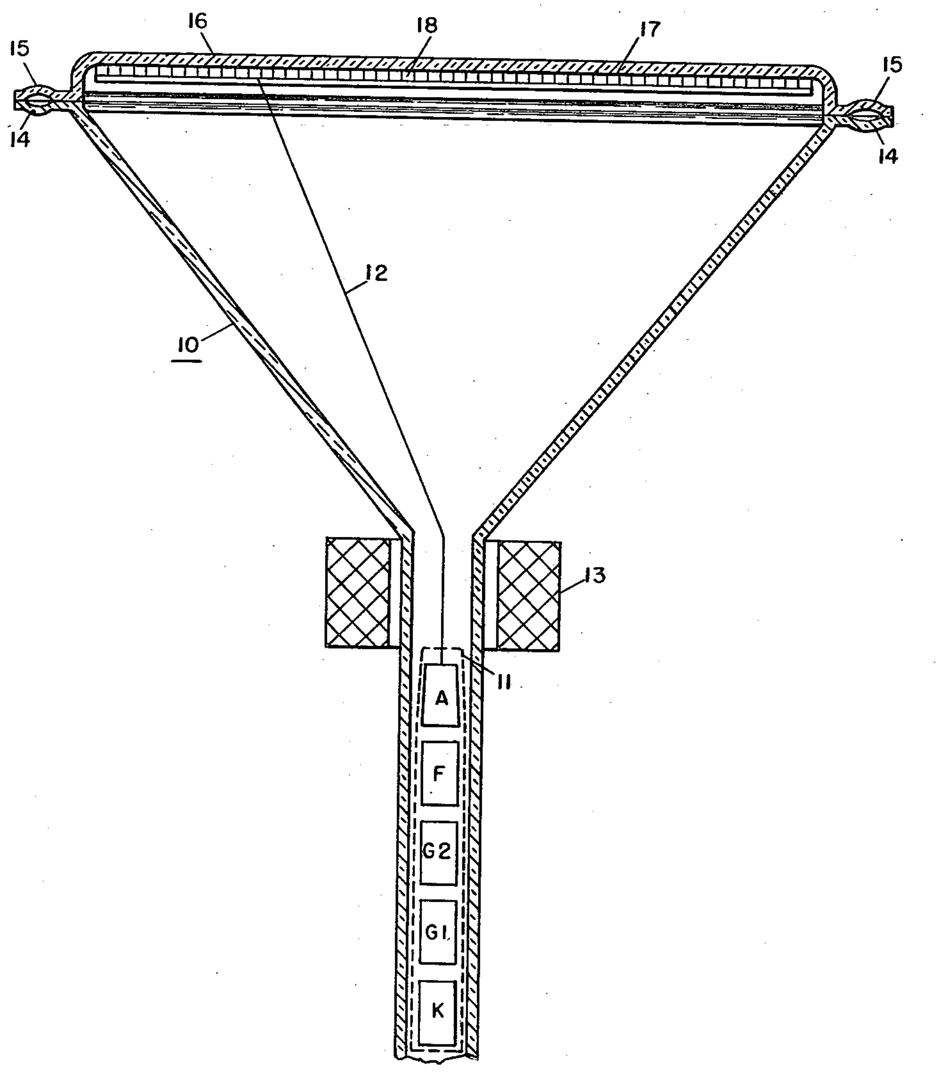

Referring to Figure 1, there is shown a diagrammatic horizontal cross-sectional view of a color television tube embodying the instant invention.

Tube 10 is a glass envelope containing within its tubular neck an electron gun 11 which may comprise various elements, such as a cathode (K), first and second grids ($G_1$, $G_2$), a focusing electrode (F), an accelerator electrode (A) and others. The electron gun assembly emits a stream of electrons 12 which is deflected for scanning purposes, the figure illustrating a magnetic deflection coil 13. Tube 10 terminates in a flange 14 which is eventually sealed to a similar flange 15 which forms part of the glass face plate 16. On the inner surface 17 of this faceplate, which may be flat, cylindrical, spherical, or any other desirable configuration, is located a phosphorescent screen 18 comprising in part, vertical stripes of phosphors, deposited thereon in any suitable manner. It will be understood that as the beam is deflected to sweep horizontally across the screen, it will sequentially impinge on the vertical stripes which emit light of different colors as hereinafter described.

Figure 2:
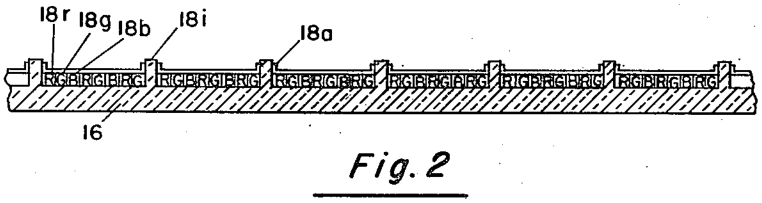
Figure 2 is an enlarged cross-sectional view of the phosphor screen taken along the lines 2—2 of Figure 3.

Referring now to Figure 2, which is a detailed cross-section of the screen and faceplate, the glass faceplate is again indicated by reference character 16, and screen 18 is here shown as comprising alternate phosphor stripes **18*r*, 18*g* and 18*b*. The designation 18*r* indicates that this stripe consists of a phosphor which emits red light. Similarly stripes 18*g* emit green light, while stripes 18*b* emit blue light. As shown, every third blue stripe is replaced by a raised insulated rib 18*i*; this particular arrangement is preferred because the loss of blue in these amounts is not deleterious to the final color quality. The rib itself may be of glass integrally molded as part of the faceplate, or it may be of any other suitable material and structure. The screen 18 is covered with a conductive, electron-permeable layer 18*a*, such as evaporated aluminum, which has been removed from the insulating ribs 18*i*** only.

Figure 3:
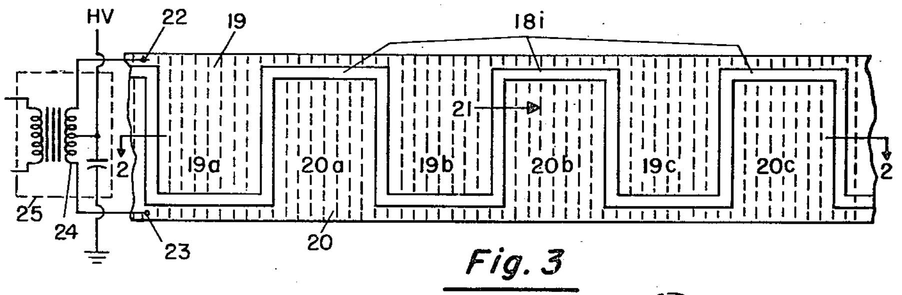
Figure 3 is an enlarged elevational view of the above screen, the view being enlarged more in the horizontal than in the vertical dimension in order to facilitate description.

Figure 3 is another view of screen 18, as seen from the electron gun, and dimensionally distorted for convenience. The insulating ribs **18*i* are seen to form a continuous path, dividing the aluminized surface 18*a* into two separate conductive areas, 19 and 20**. In this view the phosphor stripes are under the aluminum layer, and are indicated by the dotted lines.

The electron beam scans the screen horizontally as indicated by arrow 21. During the interval in which the beam traverses the sections **19*a*, 19*b* and 19*c* of area 19 which are electrically connected, beam electrons are deposited on the aluminized surface and a voltage is developed at collector contact 22. In a similar manner, a voltage is developed at contact 23 while the beam traverses areas 20*a*, 20*b*, and 20*c***, which are also a single electrical unit.

These voltages are applied to the center tapped primary winding 24 of transformer 25. The voltage this generated is utilized to perform the sensing function previously described. Due to the finite resistance and inductance inherent in the circuit, the voltage generated takes the waveform 26 indicated in Figure 4. This waveform tends to assume the shape of a sine wave, but may be modified as hereinafter described.

During periods of black-out, i. e. no video information, the electron beam of course continues to sweep across the fluorescent screen at the scanning rate as determined by the received signal. In order to maintain synchronization between the spot position and the phasing network it is imperative that the sensing voltage be continually generated. Therefore the beam intensity must not drop below a predetermined minimum. This value, however, may be so high that some electrons from the beam pass through the conductive layer and strike the phosphors, causing them to glow when the screen should be dark. It may then be desirable to use a filter-type faceplate so that the screen appears black to the viewer.

Figure 4:
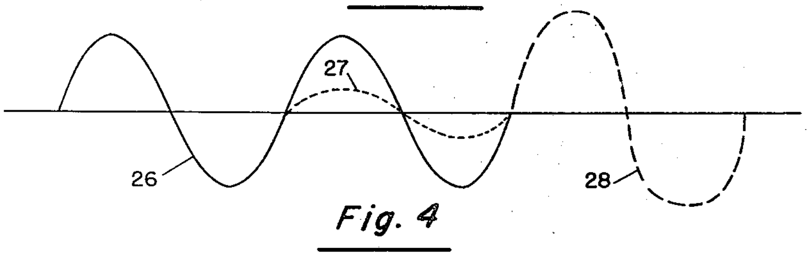
Figures 4 and 5 are waveforms produced in the electrical circuit.

It will be noted that the zero value of the sensing voltage 26 of Figure 4 occurs when the beam impinges on an insulating rib 18*i*, and that the amplitude will depend on the intensity of the electron beam. The frequency of the sensing voltage will of course vary with the instantaneous scanning speed and the number of insulating ribs traversed in a given period of time.

The instantaneous scanning speed must not be confused with the scanning rate. The latter is currently fixed by the Federal Communications Commission specifications as 15,734 horizontal scansions per second, and pulses are included in the transmitted signal to assure that the receiver is synchronized. However, within the time duration of a single horizontal scansion, the instantaneous scanning speed may vary for several reasons; ranging from a malfunctioning deflection system to the geometry of the tube. Whether the instantaneous scanning speed be ideally constant, or whether it varies due to uncontrollable factors, the frequency of the sensing voltage transmits this knowledge to the phasing circuits.

As was previously mentioned, the functions of writing and sensing are combined. Thus the electron beam develops the sensing waveform 26 during a video black-out. When a signal is being received, the intensity of the electron beam is increased so that more electrons strike the sensing plates 19 and 20, and more electrons pass through to strike the deposited phosphors. Many of these "writing" electrons will find their way back to the sensing plates. Assuming a white signal, the electron beam strength will remain substantially constant over the entire scansion. The voltage produced by the additional electrons is shown as waveform 27 of Figure 4. Waveform 28 shows the increased amplitude of the sensing voltage waveform due to the higher beam intensity caused by a video signal. It will be recalled that waveform 28 is based on receipt of a white signal. If the signal were other than white, waveform 27 would depart from a sine wave.

It will be obvious that the voltage 27 due to the writing beam passing over plate 19 will be in opposite phase to the voltage developed during passage over plate 20, because of the center-tapped winding 24. Therefore, as far as the sensing circuit is concerned, the voltage distortion caused by the electrons of the writing beam tends to cancel out.

In order to completely eliminate the effects of the writing function as disclosed in waveform 27 and 28, composite wave 28 is passed through a clipper stage which clips the top and bottom. This action produces a new waveform which tends to be rectangular but which may vary in shape with intensity variation of the beam. This new waveform may be converted to a sine wave by use of appropriate circuitry. Thus, the sensing wave is converted to a sine wave of constant amplitude, and a frequency which depends upon the instantaneous scanning speed. In order to obtain synchronization, this waveform is passed through a harmonic generator, and the 6th harmonic is selected as the final sensing voltage. In the illustration of Figure 5, this waveform 29 is shown in time-space relationship to the previously described elements. It will be seen that waveform 29 has a peak corresponding to each red stripe of Figure 2. Each time the electron beam, in either its sensing or its writing function, impinges on a red stripe the sensing voltage is at a maximum. This peak is used as a time reference to trigger on the red video amplifier.

Again using these peaks as a zero time reference, the phasing network triggers on the green video amplifier 120° later. At an interval corresponding to 240° after the zero time reference the phasing network triggers on the blue amplifier. Thus each time the electron beam impinges on a particular color emitting area, the proper color related video amplifier is turned on by the phasing network, which meanwhile suppresses all other color information.

If for some reason the instantaneous scanning speed should increase, the frequency of the sensing voltage increases. The peak of the 6th harmonic waveform would be applied sooner to the phasing circuits, and thus trigger the video color amplifiers earlier.

It was mentioned previously that a sensing voltage is desirable, even during black-out, to maintain proper synchronization. It is possible that synchronization will be lost during retrace when the instantaneous scanning speed is extremely high; so high in fact that the 6th harmonic generated will not pass through the sensing circuits. It is therefore desirable that at the start of each horizontal scansion a few sets of sensing plates be deposited on glass which is devoid of phosphor stripes outside the viewing field. In this way mis-registry due to free running oscillations may be avoided.

Referring now to Figure 6, there is shown in block form the circuitry for the instant invention. As previously indicated, the composite sensing voltage 28 is applied to the primary winding of transformer 25. The resultant output is fed through the circuit shown. Transformer 25 may consist of one stage as shown in Figure 6 or may consist of two stages as shown in Figure 6*a*. In the latter case the output is tuned broadly to the frequency developed across one set of sensing plates 19*a* and 20*a*, and the input would be an isolation stage. All the other elements of the circuit are standard, being well known to those versed in the art.

While a preferred embodiment of the invention has been shown, it will be understood that various modifications may be made without departing from the spirit of the invention. The scope of the invention is to be determined therefore not by the foregoing description, but on the contrary solely by the claims granted to me.

What is claimed is:

1. A cathode ray tube for color television comprising, in combination, an envelope having a faceplate with an integrally molded glass rib, said rib being of sinuous configuration and raised above the surrounding glass surface, a single electron gun and a screen in said envelope, means for deflecting the electron beam from said gun to line scan said screen, said screen comprising parallel stripes of phosphor material extending perpendicular to said line scanning direction, said stripes having differing color characteristics and being arranged in a repetitive color sequence, and an electron-permeable layer of electrically conductive material substantially covering said screen, said layer being divided into two electrically separate areas by said sinuous glass rib, said areas alternating in the direction of line scanning, each said area comprising a band extending generally parallel to the line-scanning direction, and rectangular tooth-like formations extending perpendicular to the scanning direction, the teeth of one area alternating with those of the other, the spaces between the teeth of the two areas being of predetermined and equal width.

2. A cathode ray tube as claimed in claim 1, characterized in that the space between the adjacent teeth of said two separate areas are of the width of one of said color stripes, the teeth having a width substantially equal to eight times the width of a color stripe.

3. A cathode ray tube as claimed in claim 1, characterized in that the space between adjacent teeth of the two separate electrically conductive areas is the width of a single color stripe and coincides with predetermined regularly spaced stripes of a particular color.

4. A cathode ray tube for color television comprising, in combination, an evacuated envelope, a single electron gun and a screen in said envelope, means for deflecting the electron beam from said gun to line scan said screen, said screen comprising parallel stripes of phosphor material extending perpendicular to the line scanning direction, all said color stripes being of the same width, said stripes being arranged in three groups, each having a different color characteristic, said groups being arranged in a repetitive color sequence, and an electron-permeable layer of electrically conductive material substantially covering said screen, said layer being divided by a sinuous glass rib into two electrically separate areas, said division line extending in a rectangular zigzag fashion thereby presenting said layers alternately to said electron beam as said screen is line scanned, said zigzag rectangular division line is of a width equal to the width of a color stripe and characterized in that said dividing line coincides with predetermined regularly spaced color stripes of one of said three groups.

5. A device as claimed in claim 4, characterized in that said dividing line coincides with every third one of the stripes of a particular color.

6. A device as claimed in claim 4, characterized in that said zigzag conformation of said dividing line includes portions parallel to said color stripes and portions extending generally perpendicular to said color stripes, said last mentioned portions extending from one end of a particular parallel portion to the same end of the next parallel portion and from the opposite end of said next parallel portion to the corresponding end of the succeeding portion.

7. A cathode ray tube for color television, comprising an envelope having a single electron gun therein, a screen in said envelope, said screen comprising a transparent faceplate, said faceplate having a rectangular zigzag rib thereon dividing the area thereof into two portions separated by said rib, a plurality of stripes of phosphor material on said faceplate in position to be scanned by the electron beam from said gun, said stripes being of the same width as the portions of said rib which extend in a direction perpendicular to that of line scanning and being parallel to said portions of said rib, and an electrically conductive layer on said phosphor stripes, said conductive layer being divided into two separate areas by said zigzag rib, said phosphor stripes are arranged in recurring color sequence between said parallel portions of said insulating rib, predetermined ones of stripes of one of said colors being omitted and being substituted for by said parallel portion of said rib.

8. A cathode ray tube as claimed in claim 7, characterized in that said phosphor stripes are respectively red, green and blue and further characterized in that said stripes of said colors are of equal width and a sequence thereof are positioned between each pair of parallel portions of said rib, said stripes comprising two and two-thirds repetitions of said colors in the order mentioned.

9. In a color television system, in combination, a cathode ray tube having a single electron gun and a screen within an evacuated envelope, said screen comprising parallel stripes of phosphor material extending perpendicular to the direction of line scanning, said stripes having different color characteristics and being arranged in repetitive color sequence, and an electron-permeable layer of electrically conductive material substantially covering said screen, said layer being divided into two electrically separate areas, said areas alternating in the direction of line scanning, means electrically connected to said separate conductive areas to provide an A. C. voltage of a frequency determined by the instantaneous line scanning speed means for converting said A. C. voltage to a synchronizing voltage, an amplifier for each color signal and means for applying said synchronizing voltage derived from said A. C. voltage to said amplifier to trigger said amplifiers in synchronism with the position of the scanning beam on said color stripes.

10. A color television system as claimed in claim 9, wherein said means connected to said separate conductive areas comprises a center tapped transformer primary in the secondary of which said A. C. voltage is generated.

11. A device as claimed in claim 9, including clipping means to convert said A. C. voltage to a substantially square waveform.

12. A device as claimed in claim 9, wherein said converting means comprises means causing the peaks of said synchronizing voltage to occur synchronously with the positioning of the scanning beam on the stripes of a single one of said color.

13. A device as claimed in claim 12, wherein said converting means comprises phasing means to produce delayed voltage peaks occurring simultaneously with the positioning of the scanning beam on stripes of said other colors whereby each said color signal amplifier is triggered when the scanning beam is on a stripe of a corresponding color to that amplified by the particular amplifier.

14. A television system comprising: a cathode ray tube; sensing means to sense the position of the electron beam therein; amplifier means to control the intensity of said electron beam; coupling means connected between said sensing means and said amplifier means to control the operation of said amplifier means, said coupling means comprising: a center tapped transformer which generates a waveform having a basic frequency dependent on the instantaneous scanning speed of said electron beam.

15. A cathode ray tube faceplate having an integrally molded continuous sinuous glass rib on the inner surface thereof; said rib projecting above the surrounding glass surface.

References Cited in the file of this patent

UNITED STATES PATENTS

| | | |
|---|---|---|
| 2,307,188 | Bedford | Jan. 5, 1943 |
| 2,577,368 | Schultz et al. | Dec. 4, 1951 |
| 2,633,547 | Law | Mar. 31, 1953 |
| 2,657,331 | Parker | Oct. 27, 1953 |
| 2,667,534 | Creamer | Jan. 26, 1954 |
| 2,673,890 | Moulton | Mar. 30, 1954 |
| 2,700,697 | Houghton | Jan. 25, 1955 |
| 2,705,765 | Geer | Apr. 5, 1955 |
| 2,714,175 | Levy | July 26, 1955 |
| 2,715,155 | Bryan | Aug. 9, 1955 |
| 2,778,971 | Sunstein | Jan. 22, 1957 |